(12) United States Patent
Derode (10) Patent No.: US 7,066,081 B1
(45) Date of Patent: Jun. 27, 2006

(54) DEVICE FOR MAKING CHEESE AND CORRESPONDING PRODUCTION METHOD

(76) Inventor: Bernard Derode, 1 bis rue de l'Eglise, 49430 Durtal (FR)

(*) Notice: Subject to any disclaimer, the term of this patent is extended or adjusted under 35 U.S.C. 154(b) by 0 days.

(21) Appl. No.: 09/958,361

(22) PCT Filed: Apr. 6, 2000

(86) PCT No.: PCT/FR00/00877

§ 371 (c)(1),
(2), (4) Date: Jan. 10, 2002

(87) PCT Pub. No.: WO00/59294

PCT Pub. Date: Oct. 12, 2000

(30) Foreign Application Priority Data

Apr. 6, 1999 (FR) .................................. 99 04425

(51) Int. Cl.
*A23C 19/05* (2006.01)

(52) U.S. Cl. .............................. 99/453; 99/452; 99/456; 99/458; 99/462; 249/117; 249/118; 249/119; 249/180; 249/181; 249/123; 249/124; 426/512; 425/110; 425/111; 425/112; 425/116; 425/346; 425/452

(58) Field of Classification Search ................ 249/180, 249/181, 160, 184, 123, 124, 117–119, 120, 249/137; 425/5, 10, 86, 110, 111, 112, 116, 425/256, 346, 452; 99/462, 466, 457, 456, 99/453, 458, 452; 426/245, 247, 512
See application file for complete search history.

(56) References Cited

U.S. PATENT DOCUMENTS 4,568,554 A * 2/1986 Derode ...................... 426/582
4,817,515 A * 4/1989 Bjerre et al. .................. 99/454

FOREIGN PATENT DOCUMENTS

| FR | 1 123 578 | | 9/1956 |
| FR | 1 494 977 | | 12/1967 |
| FR | 2 063 234 | | 9/1971 |
| FR | 2358102 A | * | 3/1978 |
| FR | 2 533 411 | | 3/1984 |

* cited by examiner

*Primary Examiner*—Keith Hendricks
*Assistant Examiner*—Maureen Donovan
(74) *Attorney, Agent, or Firm*—Merchant & Gould P.C.

(57) ABSTRACT

The invention concerns a device for making soft cheese or fresh paste cheese comprising at least a first set of perforated cheese-moulds and at least a second set of perforated cheese-moulds arranged in a chamber. The invention is characterized in that said first and second sets of cheese-moulds are designed to be fitted one into the other.

16 Claims, 8 Drawing Sheets

DEVICE FOR MAKING CHEESE AND CORRESPONDING PRODUCTION METHOD

The invention relates to the field of methods and devices used to produce cheese.

More precisely, the invention relates to such methods and devices used to produce cheese, particularly soft and fresh cheeses.

For a long time cheese was produced by hand and was only industrialized relatively recently. The industrial methods are used to produce cheese on a large scale. The methods used for small- or medium-sized productions remain relatively crude. However, certain requirements, particularly those resulting from the regulatory provisions imposed by the European Union, impose standardization in cheese production mainly in order to have improved control over the composition and hygiene level.

Various methods and devices have already been proposed in the prior art to rationalize, standardize and optimize/the different production stages of fresh and soft cheeses that can be implemented on a small or medium scale.

In this context reference may be made to the method and device described in French patent FR-2 533 411 and filed by the present applicant. The technique described in this patent proposes a device for producing soft or fresh cheeses comprising at least one set of perforated moulds positioned in a chamber provided with means for draining whey. The device is also provided with means for distributing the mixture of milk, rennet and ferments in the perforated moulds. Once the milk has been curdled the whey is drained off by the drainage means provided for this purpose and the curds are recovered after the moulds have been removed from the chamber and the curds released from the moulds. The curds are then put into a curing room to be changed into cheese.

The main advantage offered by this type of device is to enable the production of fresh or soft cheeses to be standardized under excellent food hygiene conditions.

Moreover, this type of device can be produced as a mobile unit that is both easy to transport and use, particularly in countries where agriculture is still performed traditionally.

It should be noted that it is generally preferable to be able to produce a maximum number of cheeses in any given location. The moulds of the device described above are, however, separated from each other by relatively large gaps to enable the curds to be separated when the curds are released from the moulds onto a rack. This type of device therefore presents a relatively low ratio of space occupied to curds produced.

The main aim of the present invention is to propose an improvement to this type of device that increases the number of curds produced for a device of given volume.

Another aim is to produce such a device that is extremely easy to use and that, where appropriate, can dispense with the use of any electrical means.

A further aim of the invention is to propose such a device that can be produced at reasonable cost.

Yet another aim of the invention is to disclose such a device that may be simply produced as a mobile unit that is easily transportable.

These aims are achieved by the invention that relates to a device for producing soft or fresh cheeses comprising at least a first set of perforated moulds and at least a second set of perforated moulds positioned in a chamber provided with means for draining whey characterized in that said first and second sets of moulds are designed to be inserted into each other.

It should be noted that the term "sets of moulds" in the present application refers to an assembly of several moulds that are structurally connected to one another.

The present invention proposes a new device that takes advantage of the space between the moulds, which was hitherto unused, to accommodate the moulds. It is therefore possible to increase the capacity of the existing devices described above.

In one preferred version of the invention that is more complex but of particular interest the device is characterized in that said first and second sets of moulds are designed to be inserted head to foot in order for each to operate in conjunction with at least one removable end rack, said chamber being provided with rotating means and a surface constituting a removable base.

In a preferred version of the invention said first and second sets of perforated moulds are mounted to slide in said chamber which enables them to be removed easily from the chamber.

Several types of devices can be envisaged for rotating the chamber. However, in one particularly interesting version the means used to rotate the chamber are means for pivoting said chamber around an axis. Advantageously said means could be manually actuated to simplify production of the device and increase its field of use.

In order to occupy virtually all the volume in the chamber the moulds of the first set have, advantageously, a transverse cross-section that essentially matches that of the second set. Said cross-sections may be in one of many shapes. For instance, the moulds may have a square or rectangular transverse cross-section. In another version moulds are used that have a hexagonal transverse cross-section. In yet another embodiment a first set of moulds could be used that have a square or rectangular transverse cross-section while the second set of moulds have an octagonal transverse cross-section. In general, any type of cross-section(s) could be used provided it enables the perforated moulds to occupy the maximum volume in said chamber.

The invention also relates to a method for producing cheese using a device such as that described above, the method comprising the following stages that consist in:
  filling said chamber at least partially with milk;
  allowing the milk to curdle until curds and whey are obtained;
  using said drainage means to drain the whey from said chamber;
  using said rotating means to rotate said chamber;
  disconnecting the rack in the lower position and removing the curds from the set of molds on said rack;
  disconnecting the surface constituting the base of said chamber;
  using said rotating means to rotate said chamber;
  disconnecting the other rack in the lower position and removing the curds from the other set of molds on said rack.

It should be noted that the surface constituting the base may be disconnected before or after the chamber has rotated.

According to a preferential aspect of the invention the method comprises additional stages that consist in sliding the first and second sets of moulds before disconnecting said racks.

It should be noted that in another embodiment, which enable smaller cheeses to be produced with less milk, the height of the moulds of the first set and that of the moulds of the second set is more or less half the height of said chamber, said moulds of the second set have a perforated base whereas each end of the other mould(s) is open and the device comprises an intermediary rack provided with apertures the size of the cross-section of the moulds of the second set capable of operating in conjunction with one end of the moulds.

In this configuration the method for using such a device comprises the following steps that consist in:
  filling said chamber at least partially with milk to which rennet and ferments have been added;
  allowing the milk to curdle until curds and whey are obtained;
  using said drainage means to drain the whey from said chamber;
  raising and fastening the second set of moulds;
  positioning said intermediary drainage rack on said first set of moulds;
  positioning a drainage rack on the upper section of the chamber;
  using said rotating means to rotate said chamber;
  replacing the surface constituting the base of said chamber with a drainage rack;
  using said rotating means to rotate said chamber;
  disconnecting the rack in the lower position and removing the curds from the set of molds on said rack;
  using said rotating means to rotate said chamber;
  disconnecting the other rack in the lower position and removing the curds from the other set of molds.

Various methods may be envisaged to create the sets of moulds used in the present invention. However, the sets of moulds are preferably constituted by associating matching plastic plates that form half-moulds created by thermoforming. The plate halves may, if required, be connected to the device using the fastening means provided on the drainage racks or chamber. The plates can be easily cleaned either in situ or once they have been disconnected from the chamber. In order to clean the plates in situ the moulds created by associating said matching plates have inter-mould passages that enable the cleaning products to circulate easily.

Finally, it should be noted that the invention also relates to a system for cutting coagulum that can, if appropriate, be used with the device of the invention. This type of system for cutting coagulum consists of a horizontal support on which a set of vertical rods is fastened perpendicular to said support and provided with wires in a star configuration and means to set said rods rotating. The rotating rods cut the coagulum in the cheese paste inserted in the various moulds.

Other advantages of the present invention will be better understood from the following description. The description is of a non-limitative embodiment and refers to the attached figures where.

Figure 1:
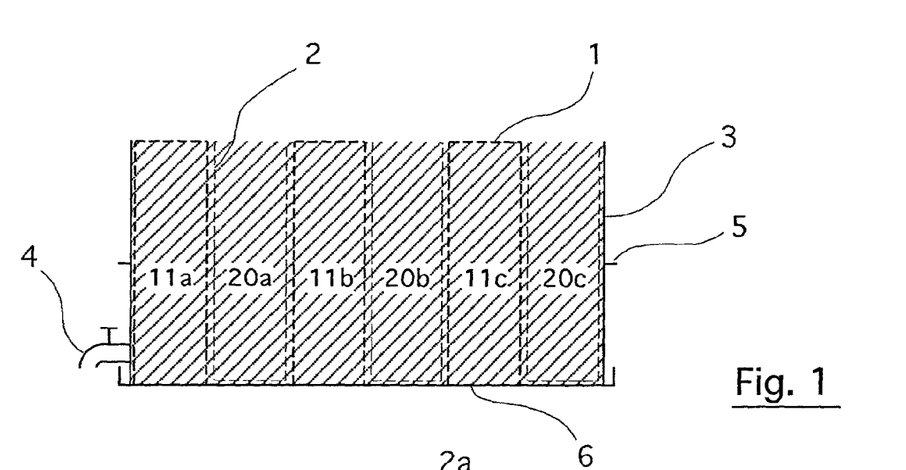
FIGS. 1 to 6 are schematic, transverse cross-sections of a first embodiment of a cheese production device of the invention shown at various stages in the method for use.

Referring to FIG. 1, the cheese production device of the invention comprises a chamber 3 inside which a first set 1 of moulds 11*a*, 11*b*, 11*c* and a second set 2 of moulds 20*a*, 20*b*, 20*c* are positioned. Clearly only the first series of the sets of moulds can be shown in FIGS. 1 to 6 but in fact said sets of moulds comprise several series of moulds.

The entire surfaces of moulds of first set 1 and moulds of second set 2 are perforated to enable the milk fluids used to produce the cheese to drain away.

In the position of the device shown in FIG. 1, the lower part of the moulds of first set of moulds 1 is open whereas in second set of moulds 2 upper part 2 is open. As shown in FIG. 1, set 1 of moulds 11*a*, 11*b*, 11*c* is shown inserted head to foot in set 2 of moulds 20*a*, 20*b*, 20*c*. Set 1 of moulds 11*a*, 11*b*, 11*c* is designed to operate in conjunction with a rack (shown in one of the following figures). Similarly, set 2 of moulds is also designed to operate in conjunction with another rack (which is also shown in another figure).

It should also be noted that chamber 3 is provided with whey drainage means 4 in the shape of a simple tap and is fitted with a surface constituting base 6.

The device can also be fitted with automatic means (not shown) for distributing the mixture of milk, rennet and ferments used to produce the cheese.

The method for using this type of cheese production device is described below in reference to FIGS. 1 to 6.

In the first phase of the method, chamber 3 is filled with a mixture of milk, rennet and ferments. The mixture is shown by wide hatched lines in FIGS. 1 and 2.

Figure 2:
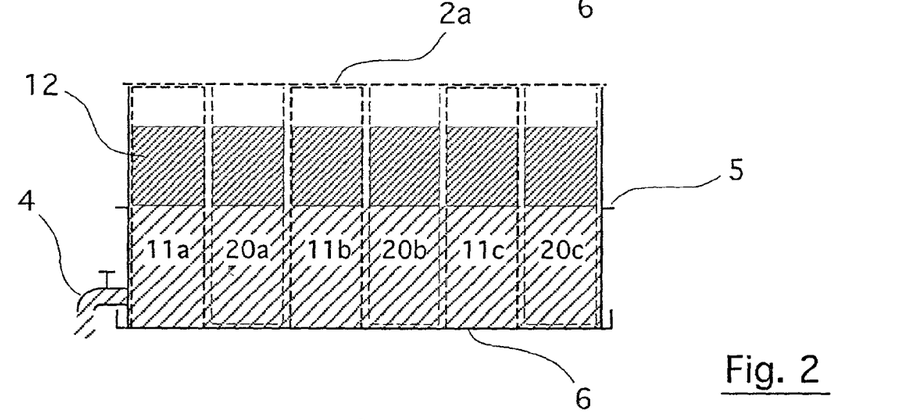

The mixture is left in the chamber until curds 12 form, as shown in FIG. 2. The curds float to the surface of the whey as they have a lower degree of density than said whey.

The whey is then drained away by drainage means 4 provided for this purpose. The curds then lie on the base of chamber 3.

Figure 3:
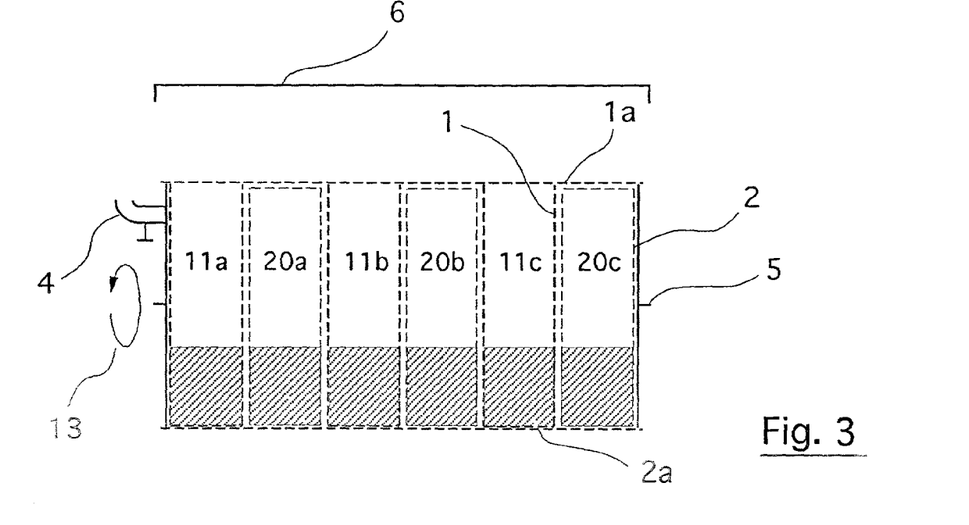
Figure 4:
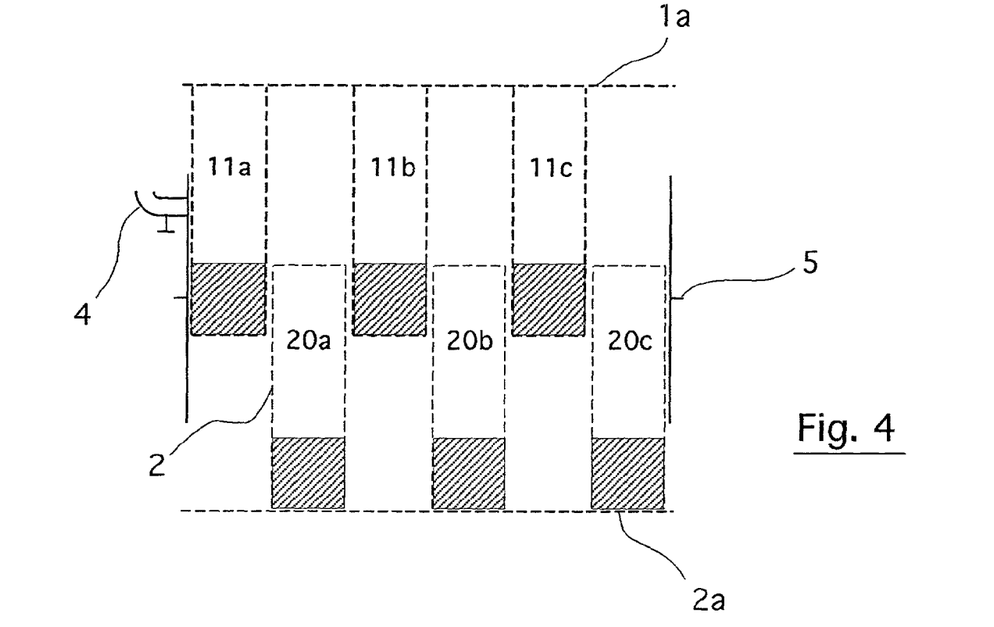
Figure 5:
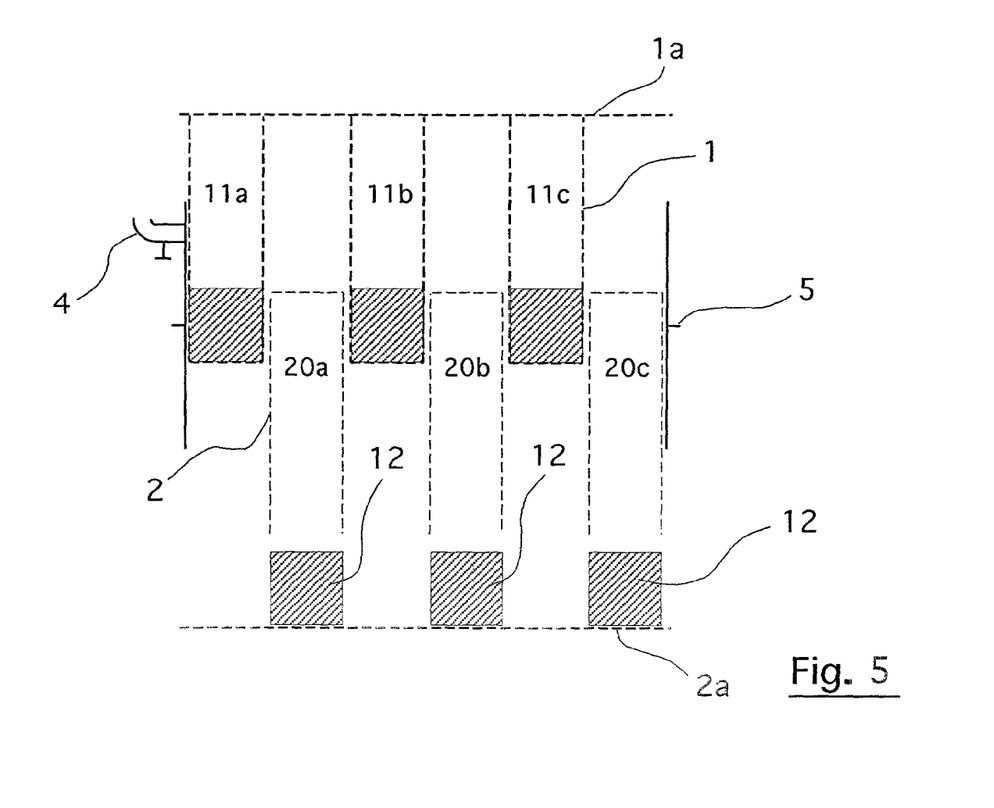

Firstly, the curds in moulds 20*a*, 20*b*, 20*c* of set 2 are removed. For this purpose, rotating means 5, which in this configuration consist of means for pivoting around an axis as shown by circular arrow 13 in FIG. 3, are actuated. Simultaneously, base 6, which is the upper position, is disconnected from the rest of the chamber. The assembly consisting of set of moulds 2 and rack 2*a* then slides downwards, as shown in FIG. 4. Rack 2*a* is then lowered further in order remove curds 12 from said rack.

Figure 6:
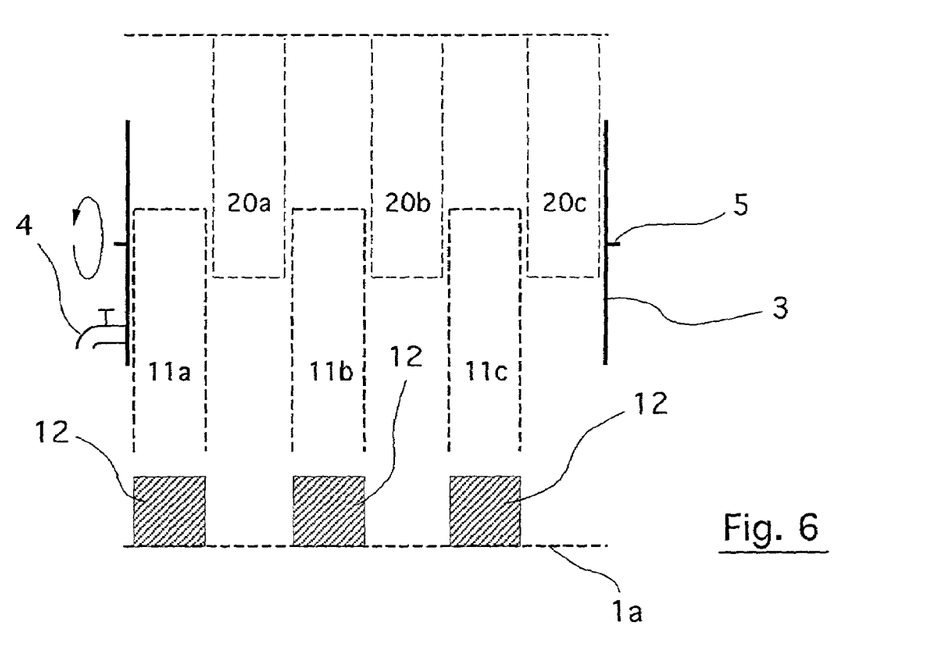

The curds are then removed from set 1 of moulds 11*a*, 11*b*, 11*c* by actuating means 5 provided for this purpose to pivot chamber 3, as shown in FIG. 6. Curds 12 are then removed from rack 1*a*.

This type of device therefore optimizes the volume contained within chamber 3 by increasing the number of cheeses that can be produced from the mixture of milk, rennet and ferments deposited in said chamber. It is clear that the invention enables all the space to be taken up by moulds 11*a*, 11*b*, 11*c*, 20*a*, 20*b*, 20*c* of the two sets of moulds.

Figure 7:
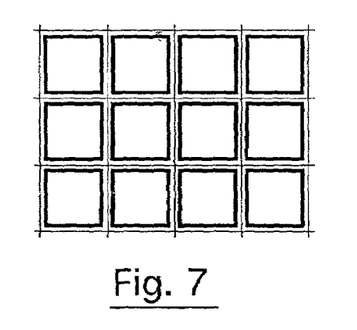
FIGS. 7 to 9 show non-limitative examples of cross-sections of moulds that could be used to implement the invention.
Figure 8:
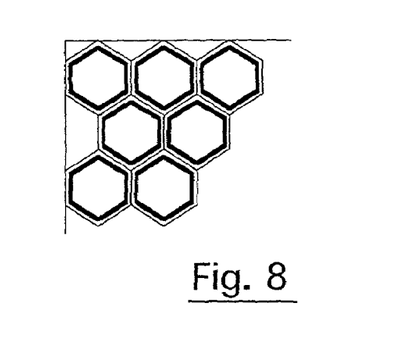
Figure 9:
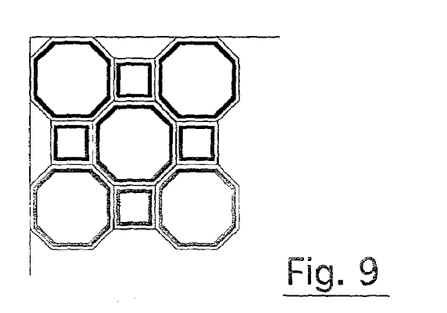

It should be noted that in the present embodiment the moulds have a square transverse cross-section as shown in FIG. 7. However, it is clear that in other embodiments the moulds can also have various additional cross-sections in order to occupy all, or at least most, of the volume within the chamber. As a non-limitative example the moulds may have a hexagonal transverse cross-section as shown in FIG. 8. An octagonal set of moulds could also be used with another set of moulds with a square cross-section as shown in FIG. 9. It should be noted that unperforated parts, whether fastened or otherwise to the chamber, may be used to fill the wasted space within that is unoccupied by the moulds.

Figure 10:
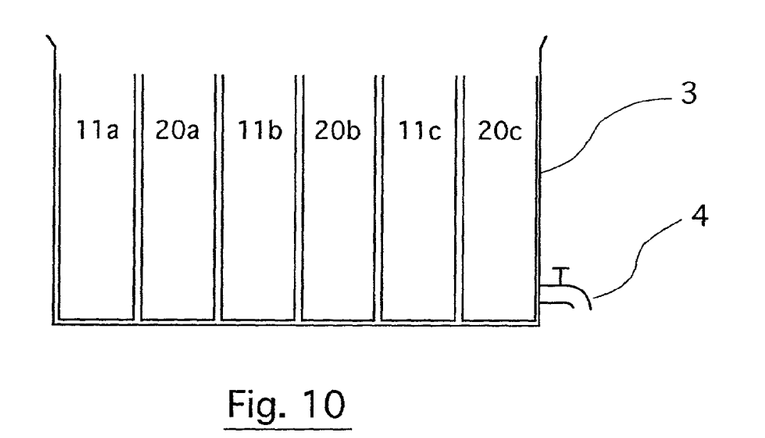
FIG. 10 is a schematic transverse cross-section of a second embodiment of the invention.

Another embodiment of the invention is shown in FIG. 10. In the description of this embodiment the parts which, in functional terms, resemble those in the example described above are given the same references.

In this embodiment the device of the invention comprises a chamber 3 in which a first set of moulds 11*a*, 11*b* and 11*c* (connected together) are provided and a second set of moulds 20*a*, 20*b* and 20*c* (connected together) that is inserted in the first set of moulds in order to occupy virtually all the volume contained within chamber 3. Once the milk has curdled the whey is drained off by means 4 (the whey could also be drained by turning chamber 3 upside down). This type of embodiment is very simple to use and transport.

In the embodiment shown in FIGS. 11 to 17 the device comprises a chamber 3 in which two sets of perforated moulds 11*a*, 11*b*, 11*c* and 20*a*, 20*b*, 20*c* are provided the height of which is more or less half that of chamber 3. This embodiment is used to produce smaller cheeses with less milk.

Figure 11:
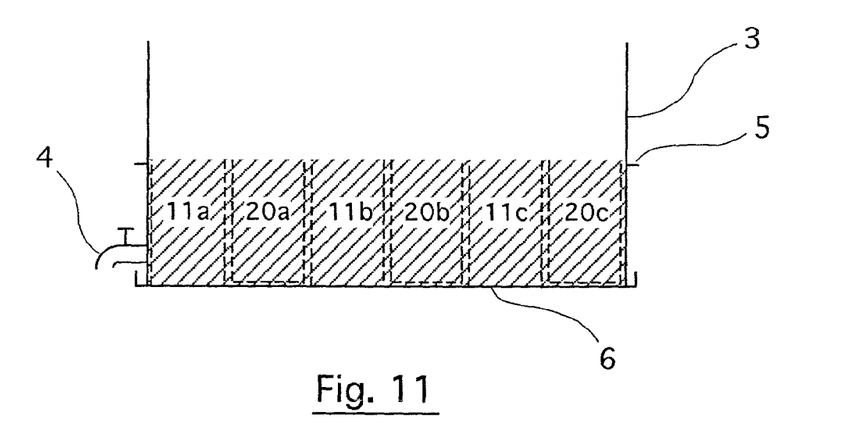
FIGS. 11 to 17 are schematic, transverse cross-sections of a third embodiment of a cheese production device of the invention shown at various stages in the method for use.

Both the lower and upper ends of the first set of moulds 11*a*, 11*b*, 11*c* are open whereas the upper section of moulds 20*a*, 20*b*, 20*c* of the second set are open and have a perforated lower base.

The first set of moulds 11*a*, 11*b*, 11*c* is inserted head to foot in the second set of moulds 20*a*, 20*b*, 20*c*. These two sets of moulds are designed to operate in conjunction with the two drainage racks for the first set and a rack for the second set.

It should be noted that chamber 1 is provided with means 4 for draining the whey and is fitted with a removable base 6.

Figure 12:
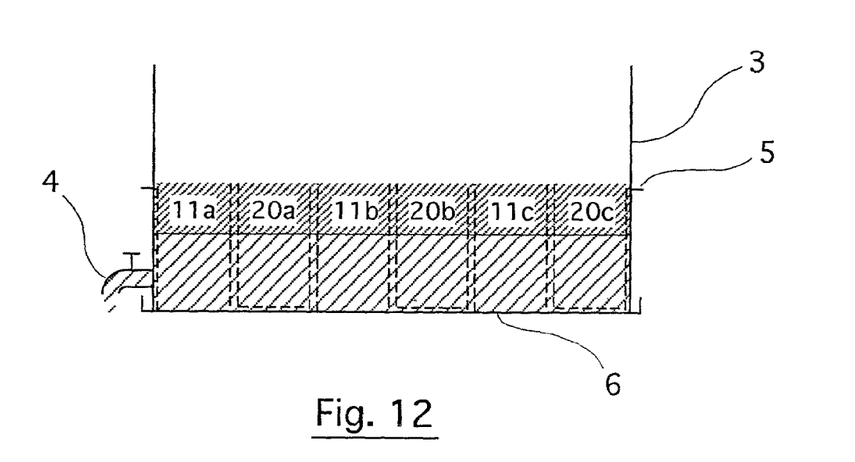

The method for using this type of device is as follows:

In the first phase chamber 3 is half filled with a mixture of milk, rennet and ferments. The mixture is shown by wide hatched lines in FIG. 11. The mixture is left in chamber 3 until curds 2 form, the curds floating to the surface of the whey as shown in FIG. 12.

The whey is then drained away by drainage means 4 provided for this purpose. The curds then lie on the base of chamber 3.

Figure 13:
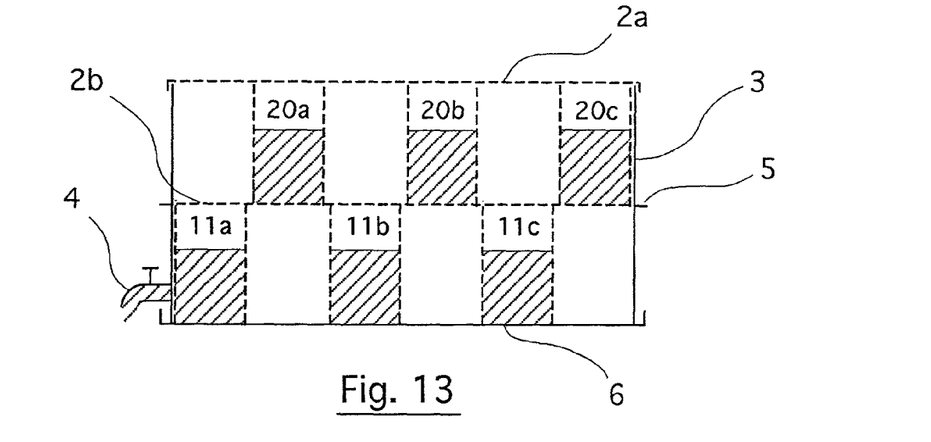

The second set of moulds 20*a*, 20*b*, 20*c* is then raised and fastened by any suitable means (not shown) to the top of chamber 3. An intermediary drainage rack 2*b* is then positioned half way up chamber 3. Drainage rack 2*b* is provided with apertures the size of the cross-section of moulds 20*a*, 20*b*, 20*c* such that it only lies on moulds 11*a*, 11*b*, 11*c*. Finally, a second drainage rack 2*a* is positioned at the top of the chamber. These stages are shown in FIG. 13.

Figure 14:
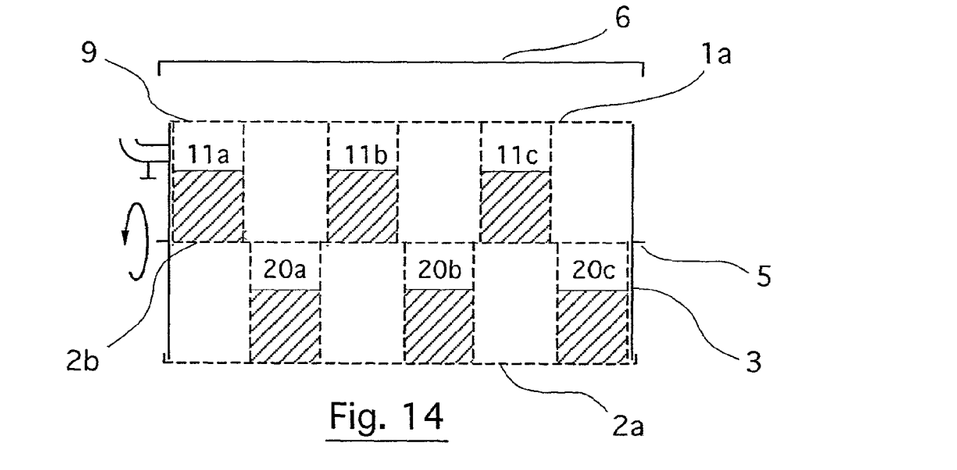

During drainage rotating means 5 are actuated and removable base 6 is replaced with a drainage rack 1*a*, as shown in FIG. 14.

Figure 15:
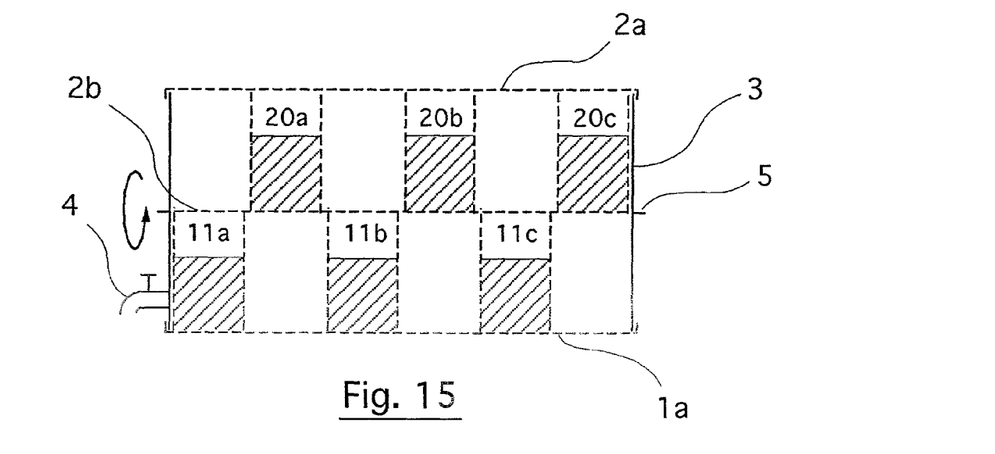
Figure 16:
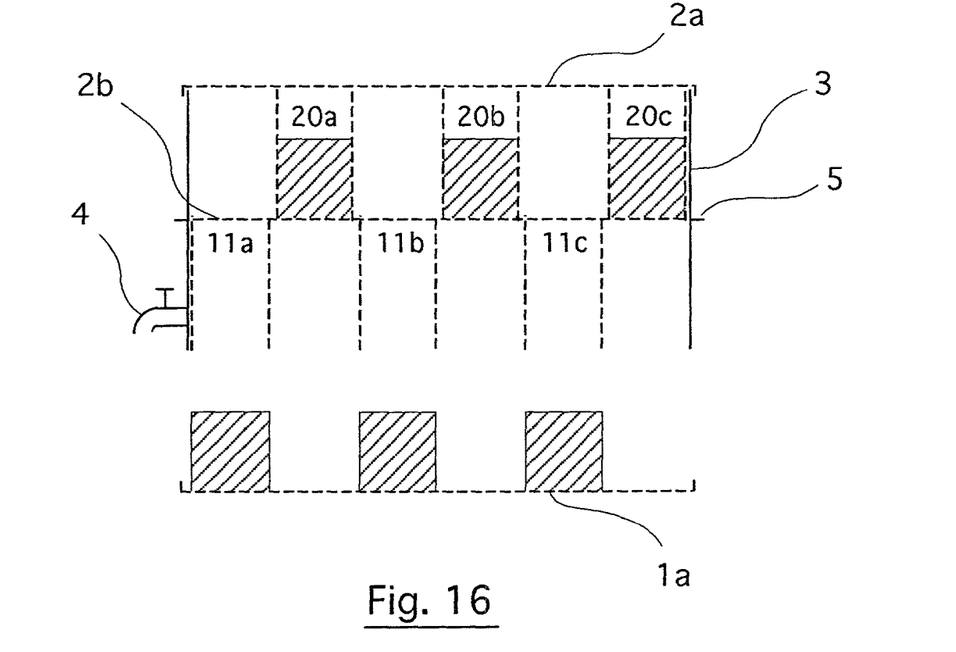

The curds are then removed from the set of moulds 11*a*, 11*b*, 11*c* such that they are located in the lower section and drainage rack 9 is disconnected. These stages are shown in FIGS. 15 and 16.

Figure 17:
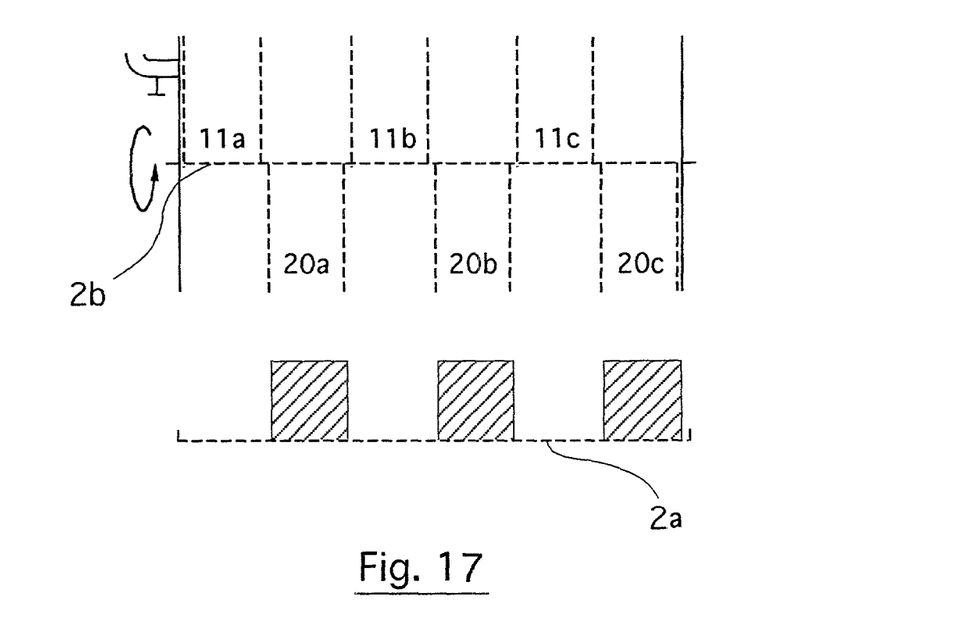

The same procedure is performed to remove the curds from the set of moulds 20*a*, 20*b*, 20*c* once chamber 3 has been pivoted, as shown in FIG. 17.

Figure 18:
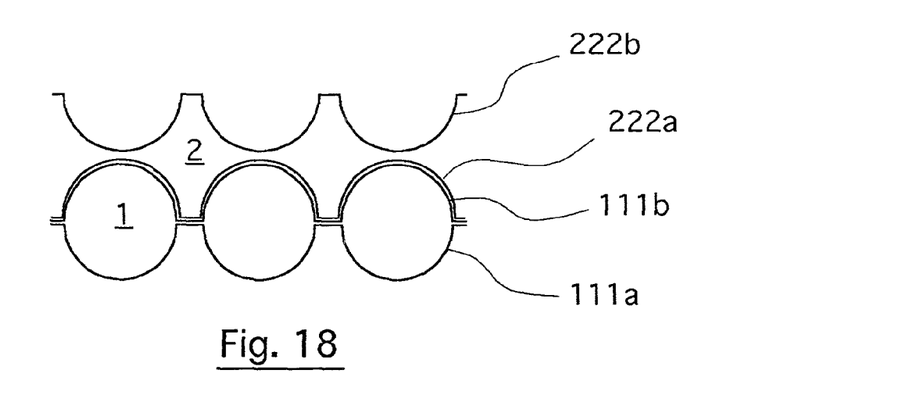
FIGS. 18 to 20 show the sets of moulds of another embodiment of the invention.

Referring to FIG. 18, the set of moulds of yet another embodiment of the invention are shown in a top view. The moulds of first set 1 of moulds have a circular cross-section and the moulds of second set 2 of moulds have a matching cross-section. The sets of moulds are constituted by associating matching plastic thermoformed plates (111*a* and 111*b* for the first set of moulds and 222*a* and 222*b* for the second set of moulds respectively). This type of thermoforming technique reduces the production costs of the moulds considerably.

Figure 19:
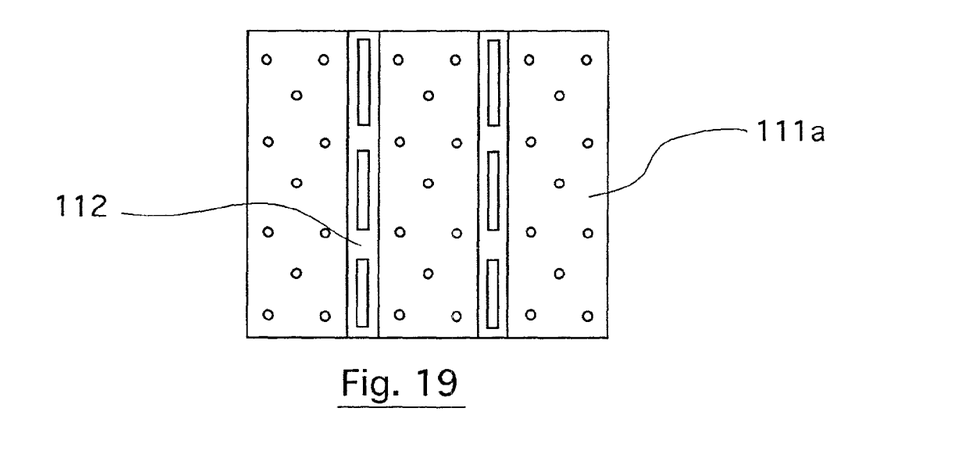

As may be seen in FIG. 19, which shows a front view of plate 111*a*, inter-mould passages 112 are provided to facilitate cleaning of said passages.

Figure 20:
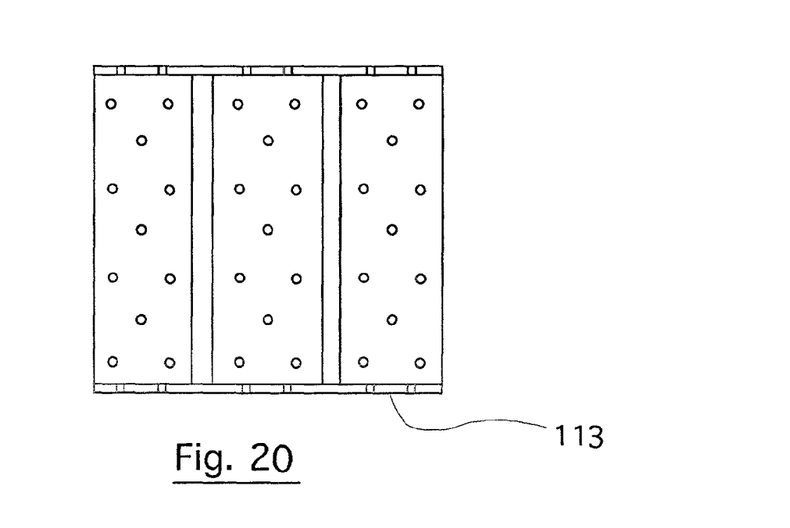

As may be seen in FIG. 20, which shows a front view of plate 222*a*, the plates can be fastened to the drainage racks by fastening means 113.

Figure 21:
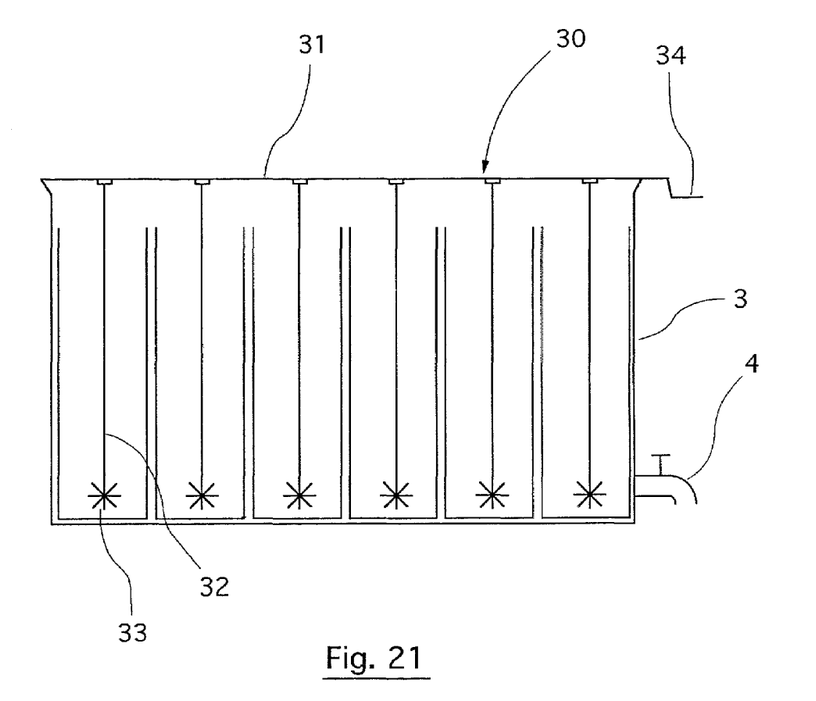
FIG. 21 shows a diagrammatic view of a cutting system for the cheese production system.

Finally, as shown in FIG. 21, the coagulum of the cheese paste may be cut using a coagulum cutting system 30 specially designed by the applicant to be used with the cheese production device of the invention.

This device for cutting coagulum consists of a horizontal support 31 on which a set of vertical rods 32 is fastened perpendicular to said support and provided with wires in a star configuration 33 and means 34 to set said rods 32 rotating. Means 34 may be either manual or motorized. The rotation of wires in a star configuration 33 cause the coagulum to be cut.

The aim of the embodiments of the invention described above is not to reduce the scope of said invention. Consequently, a number of modifications may be provided and still remain within the scope of the invention. In particular, it should be noted that more than two sets of moulds may be used.

The invention claimed is:

1. Device for producing soft or fresh cheeses, comprising;
   at least a first set of perforated moulds, and
   at least a second set of perforated moulds, and
   a chamber provided with rotating means and a surface constituting a removable base,
   wherein said first and second sets of moulds or designed to be inserted into each other and are designed to be inserted head to foot, wherein each is configured to be operated in conjunction with at least one removable end rack, and
   wherein said first and second sets of moulds are configured to be positioned in the chamber.

2. Device of claim 1 wherein the device is provided with means for draining off whey.

3. Device of claim 1 wherein said first and second sets of perforated moulds are mounted to slide in said chamber.

4. Device of claim 1 wherein said rotating means are means for pivoting around an axis.

5. Device of claim 1 wherein the moulds of the first and second sets have a transverse cross-section and occupy virtually all the volume in said chamber.

6. Device of claim 5 wherein said moulds of the first and second sets have a square or rectangular cross-section.

7. Device of claim 5 wherein said moulds of the first and second sets have a hexagonal transverse cross-section.

8. Device of claim 5 wherein the moulds of the first set have a square or rectangular transverse cross-section and the moulds of the second set have a hexagonal transverse cross-section.

9. Device of claim 1 wherein the height of the moulds of the first and second sets is half the height of said chamber, and wherein the moulds of the second set have a perforated base and each end of the moulds of the first set is open, and
   wherein the device further comprises an intermediary rack provided with apertures the size of the cross-section of the moulds of the second set for operating in conjunction with one end of the moulds of the first set.

10. Device of claim 1 wherein said first and second sets of moulds are created by associating matching plastic thermoformed plates, to form half-moulds.

11. Device of claim 10 wherein the device comprises means provided on drainage racks or the chamber for fastening said plates to the device.

12. Device of claim 10 wherein said matching plates, have inter-mould passage, and wherein the passage allow cleaning products to easily circulate.

13. Device of claim 2 wherein said first and second sets of perforated moulds are mounted to slide in said chamber.

14. Device of claim 2 wherein said rotating means are means for pivoting around an axis.

15. Device of claim 3 wherein said rotating means are means for pivoting around an axis.

16. Device of claim 11 wherein said matching plates have inter-mould passages, and wherein the passage allow cleaning products to easily circulate.

* * * * *